(12) United States Patent  
Watson

(10) Patent No.: US 7,985,364 B1
(45) Date of Patent: Jul. 26, 2011

(54) METHOD OF MANUFACTURING AN INJECTION MOLDED PRODUCT

(75) Inventor: Virgil Allen Watson, Salem, IA (US)

(73) Assignee: Lomont Molding, Inc., Mt. Pleasant, IA (US)

( * ) Notice: Subject to any disclaimer, the term of this patent is extended or adjusted under 35 U.S.C. 154(b) by 0 days.

(21) Appl. No.: 12/766,286

(22) Filed: Apr. 23, 2010

(51) Int. Cl.
B29C 45/14 (2006.01)
(52) U.S. Cl. ............ 264/266; 264/279; 264/328.12
(58) Field of Classification Search ............ 264/247, 264/261, 266, 275, 279, 328.12
See application file for complete search history.

(56) References Cited

U.S. PATENT DOCUMENTS

| | | | |
|---|---|---|---|
| 3,093,865 A | | 6/1963 | Peters et al. |
| 3,154,617 A | * | 10/1964 | Schenk et al. ............ 264/266 |
| 3,951,375 A | | 4/1976 | Lovell |
| 4,076,790 A | * | 2/1978 | Lind ............ 264/266 |
| 4,108,587 A | * | 8/1978 | Rumball ............ 425/112 |
| 4,149,838 A | * | 4/1979 | Sutch ............ 425/112 |
| 4,427,618 A | | 1/1984 | Sorensen |
| 4,686,076 A | * | 8/1987 | Dromigny et al. ............ 264/268 |
| 5,193,711 A | * | 3/1993 | Hirata et al. ............ 220/62.11 |
| 5,804,117 A | | 9/1998 | Baba et al. |
| 5,916,047 A | | 6/1999 | Schickert et al. |
| 5,962,042 A | | 10/1999 | Konno |
| 5,980,400 A | | 11/1999 | Schickert |
| 6,004,231 A | | 12/1999 | Schickert |
| 6,090,327 A | * | 7/2000 | Churchwell ............ 264/328.12 |
| 6,302,461 B1 | * | 10/2001 | Debras et al. ............ 294/68.1 |
| 6,991,175 B1 | * | 1/2006 | Huang ............ 235/492 |
| 7,135,979 B2 | * | 11/2006 | Savagian et al. ............ 340/572.8 |
| 2007/0269671 A1 | | 11/2007 | Hirschfelder et al. |

FOREIGN PATENT DOCUMENTS

| | | | |
|---|---|---|---|
| JP | 60-228116 | * | 11/1985 |
| JP | 61-162311 | * | 7/1986 |
| JP | 02-164510 | * | 6/1990 |
| JP | 07-223239 | * | 8/1995 |

* cited by examiner

Primary Examiner — Jill L Heitbrink

(57) ABSTRACT

A method of manufacturing an injection molded product. Thermoplastic is injected through a runner system and into a gate member. The gate member is generally V-shaped and thermoplastic is displaced through the gate into a mold cavity at a nearly perpendicular angle to the surface of the indicia carrier to hold the indicia carrier against the mold cavity. This allows the indicia carrier to be fused to the thermoplastic body during the making of a product.

10 Claims, 2 Drawing Sheets

METHOD OF MANUFACTURING AN INJECTION MOLDED PRODUCT

BACKGROUND OF THE INVENTION

This invention relates to injection molded products. More specifically, this invention relates to a manufacturing method for producing an injection molded product.

The common and most widely used manufacturing process for signage, tag and labels has been to die cut the desired size and shape of the product from rigid sheet goods material such as plastic, aluminum or steel. Thereafter, the sign blank is decorated either by printing directly on the signage, tag and label base (usually silk screen printing) or has a preprinted polymer film that has pressure sensitive glue backing with release liner. This film is prepositioned on the sign blank and the release liner removed while workers attempt to remove all air pockets and wrinkles.

In the above described processes, both of which are done at ambient temperatures and at one atmosphere of pressure, microorganisms are entrapped between the ink or film and the sign base. These microorganisms include fungi spore and pathogens that are readily emitted from the human body (the workers) and it is not difficult for these to colonize and spread into the surrounding environment given that in certain industries regular cleaning is done with high pressure hot water and harsh cleaning chemicals. The inks and labels simply deteriorate and provide the microorganisms' access to the environment. Food processing companies are a very good example but many other industries are required to meet strict state and federal sanitation requirements. These industries spend many thousands of dollars per year conforming.

Many forms of sanitation exist to combat these issues. These include exposure to UV light and specialized cleaning chemicals. But the oldest and most widely used process for sanitation is by placing objects in an autoclave. All life forms on earth require liquid water for their survival. It is also known that certain microorganisms can live and thrive in water at 212 F so the point of an autoclave is to elevate the temperature of the liquid water within microorganisms to temperatures well above 212 F. Provided below is one recommended operating procedure for an autoclave.

A widely-used method for heat sterilization is the autoclave, sometimes called a converter. Autoclaves commonly use steam heated to 121-134° C. (250-273° F.). To achieve sterility, a holding time of at least 15 minutes at 121° C. (250° F.) or three minutes at 134° C. (273° F.) is required. Additional sterilizing time is usually required for liquids and instruments packed in layers of cloth, as they may take longer to reach the required temperature (unnecessary in machines that grind the contents prior to sterilization). It requires three to five atmospheres of pressure to achieve the above noted steam and liquid temperatures.

Another process for manufacturing signages, tag and labels is to use an injection molding process. Injection molding machines are rated by their ability to generate a clamping force that holds two mold halves together against the forces of the molten thermoplastic injected at high pressure into the runner system and cavities. Clamp pressure is calculated by multiplying length by width expressed in inches times the nozzle pressure expressed in pounds per square inch divided by 2,000 pounds per ton. That entire discussion is not novel. Multi-cavity molds have been in use for many years. It does though need set-up later discussion about label size and placement stability, manufacturing efficiency, gating techniques, etc.

In current injection molding machines that make indicia carriers such as labels, the labels are attached in the mold cavities. This is done by creating a static electric charge that is induced on the opened or air side of the label. This charge is of one polarity and is attracted to the opposite charged mold base thus trapping or pinning the label to the mold surface. The total static force acting to hold the label in position in the mold is a function of the total square area of the label being held. With larger labels used for signage products, this total static force is sufficient to hold the label in proper position. However, when using relative small labels that have little surface area the labels provide a relatively small total holding force and are easily dislodged from their proper position. In addition, typically the runner system provides the thermoplastics into the mold cavity nearly parallel to the label itself thus providing a force that often causes the label to be misplaced, mispositioned or completely dislodged. Further, wrinkles and bubbles often form under these labels causing the label to be improperly attached to the molded body after cure.

The fact that a label is not 100 percent fused to a sign or tag as a result of air bubbles or wrinkles underneath the label causes many problems. In an environment such as food processing facilities where tags are often used to identify containers of cleaning chemicals, the high moisture environment can cause mold and other biological growth to occur between the thermoplastic laminate of the mold and the paper label. This is unacceptable in sanitary environments.

In addition, in traditional tag manufacturing usually reinforcement is required around an attachment hole. This is accomplished by inserting and crimping either brass or steel eyelets in the hole. Simple miniature donut shaped cavities machine around the attachment hole produce a raised plastic donut around the hole on the finished product thereby reinforcing both front and rear sides of the hole. This process is time consuming and takes many man hours.

Thus, a principal object of the present invention is to provide a method of manufacturing an injection molded product that completely fuses a label to a molded body.

Yet another object of the present invention is to provide a method of manufacturing an injection molded product that is efficient and eliminates unnecessary man hours.

Another object of the present invention is to provide a method of manufacturing an injection molded product that improves a finished injection molding product.

These and other features, advantages and objective will be discussed in further detail in the specification and claims.

BRIEF SUMMARY OF THE INVENTION

A method of manufacturing an injection molded product. The method includes injecting thermoplastic through a runner system to a gate member. The thermoplastic is then displaced through the gate member into a mold cavity in such a manner to hold an indicia carrier against the mold cavity. The indicia carrier is then fused to the thermoplastic during the curing process.

DETAILED DESCRIPTION OF THE PREFERRED EMBODIMENT

Figure 1:
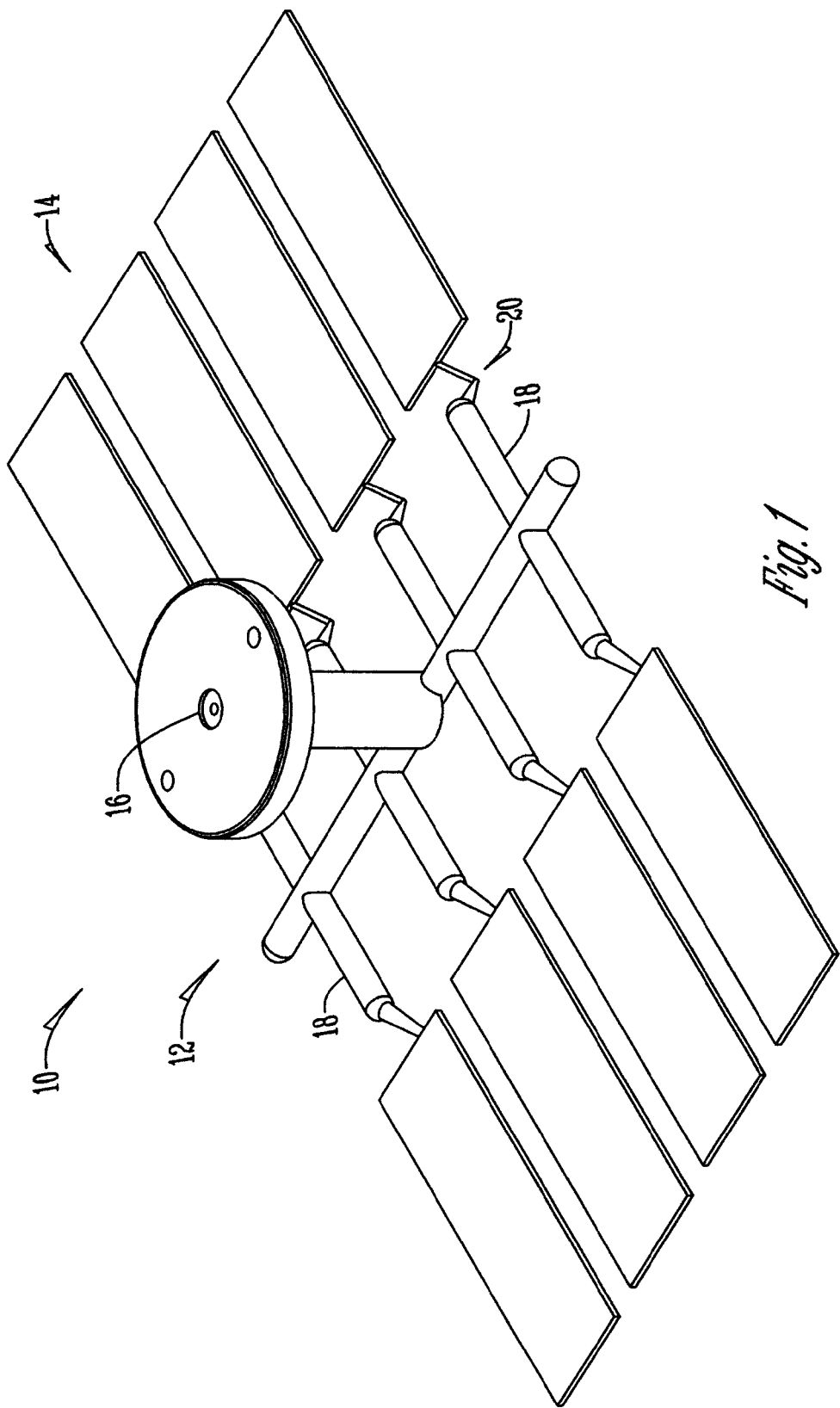
FIG. 1 is a perspective view of an injection molding machine.

The figures show an injection molding assembly 10 that has a runner system 12 that injects molten thermoplastic into a mold cavity 14. The runner system 12 has an inlet 16 and a system of conduits 18 that provide a fluid flow of pressurized thermoplastics therethrough. Connecting the system of conduits 18 with the mold cavity 14 are a plurality of gate members or tunnel gates 20.

The gate members 20 each have a first section 22 that angles downwardly from the conduit 18 of the runner system 12 toward the mold cavity 14. The first section 22 tapers inwardly to a joint 24. A second section 26 of the tunnel gate 20 extends upwardly from the joint 24 toward the mold cavity 14. In this manner, the first and second sections form a V-shape. The second section 26, like the first section, tapers inwardly such that the diameter of the connection between the gate member 20 and the conduit 18 is greater than the connection between the gate member 20 and the mold cavity 14. In addition, the second section 26 is at an angle such that the flow of material 28 into the second section 26 enters the mold cavity 14 nearly perpendicular to the flow of material 28 through the mold cavity 14.

Within the mold cavity 14 is an indicia carrier 30 that has a first edge 32. The indicia carrier 30 in one embodiment is a label. Specifically, multiple indicia carriers 30 can be utilized including a carrier 30 that has man readable labels and carriers 30 that have Radio Frequency Identification (FRID) that are non line of sight and machine readable only.

In operation, molten thermoplastic is injected through the runner system 12 to the gate member or tunnel gate 20. The thermoplastic is displaced through the gate member 20 and into the mold cavity onto the edge 32 of the indicia carrier 30 nearly perpendicular to the planar surface of the indicia carrier 30. This has the effect of mechanically pinning the indicia carrier 30 into the proper position. Thereafter as the molten thermoplastic fills the cavity 14 air bubbles and wrinkles under the indicia carrier 30 are forced out and the finished product is smooth, bubble and wrinkle free such that the indicia carrier is 100% fused to the thermoplastic. Specifically, this manufacturing process exceeds all sanitation requirements. First, the entire mass of the product is brought to 395 F and then over 1,500 pounds of pressure is exerted to force it into the tool. The product is then subjected to a packing pressure until it solidifies.

Figure 2:
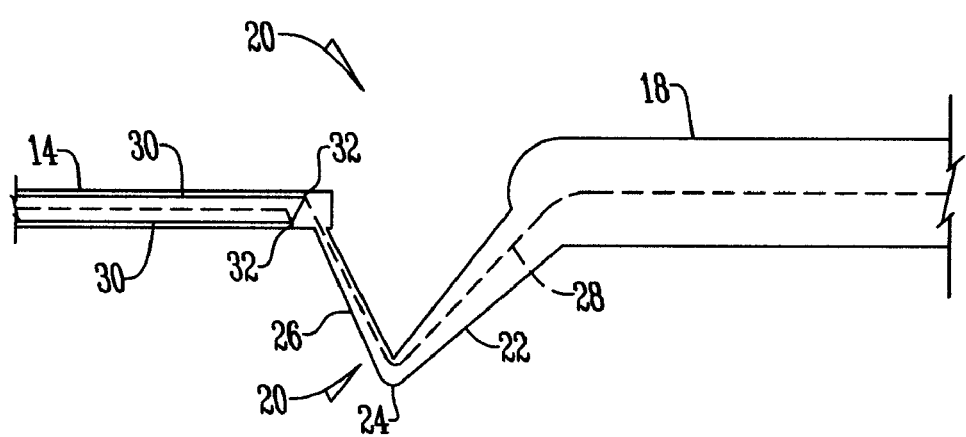
FIG. 2 is a sectional view of the connection between a runner system of an injection molding machine and the mold cavity.

In one embodiment the tag, label, sign or the like has an indicia carrier 30, both on the front and rear of the molded product such that a man readable indicia is on one side and FRID indicia is on the other side. In this embodiment the molten thermoplastic impinges on the edge 32 of a first indicia carrier 30 and is then reflected backward onto the edge 32 of a second indicia carrier 30 thereby pinning both indicia carriers 30 within the mold cavity 14 as best shown by the flow of material 28 in FIG. 2. Thus, a label utilizing a RFID is provided.

In an embodiment where ejector pins, as known in the art, are used and placed in close proximity to the gate member 20, upon the finished part injection the tag, label, sign or the like formed in the mold is sheared off of the plastic runner system 12. This eliminates the need for operators to cut and trim individual tags or labels.

Thus provided is a method for manufacturing an injected molded product that utilizes gate members 20 to provide a more efficient process and improved product. In addition, as compared to traditional tag manufacturing that requires reinforcement around an attachment hole by having the shear present this attachment method is eliminated. In addition, because the indicia carrier 30 is completely fused to the thermoplastic, moisture in high moisture environments is unable to get between the indicia carrier 30 and the molded body itself preventing contaminates from growing. Also, because the indicia carrier 30 is fused to the molded body, the indicia carrier is practically tamper proof. Any attempt to remove or modify the indicia carrier 30 is readily apparent to a casual observer. In addition, because injection molds for tags are easily manufactured with a bale or a loop of plastic that folds around an object and interlocks into a mating feature on the tag and can be used to include a padlock, additional safety is provided. In addition, a process for making labels having RFID is provided.

Thus, during the manufacturing of this product thermoplastics are heated within the barrel of an injection molding by the mechanical shear generated between the screw and the barrel. The temperature of the material exceeds 390 degrees Fahrenheit and is held under pressure until the next shot is required. At this time the material is subject to pressures exceeding 1800 PSI and is forced through the runner and gate systems. Additional heat is generated by the mechanical shear created by the forcing the material through the gates. After the cavity fills, a packing pressure is applied until thermoplastic solidifies and is ejected from the machine. These physical conditions exceed the standard operating procedures for auto clave thereby producing a sterile and safe product. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A method of manufacturing an injection molded product, steps comprising:
   placing a first indicia carrier having a planar surface on a front side of a mold cavity;
   injecting thermoplastic through a runner system to a gate member having a first and second section;
   displacing the thermoplastic into the mold cavity through the first and second sections of the gate member into a mold wherein the second section is angled such that the thermoplastic is displaced onto an edge of the indicia carrier nearly perpendicular to the planar surface of the indicia carrier to hold the indicia carrier in position against the mold cavity; and
   fusing the first indicia carrier to the thermoplastic.

2. The method of claim 1 wherein the first section tapers toward the second section.

3. The method of claim 2 wherein the second section tapers toward the mold.

4. The method of claim 1 wherein the first indicia carrier is a label.

5. The method of claim 1 wherein during the displacing step the thermoplastic flattens all wrinkles and pockets of air from under the first indicia carrier.

6. The method of claim 1 wherein the first indicia carrier has radio frequency identification thereon.

7. The method of claim 1 further comprising the step of:
   holding a second indicia carrier against the mold cavity with the thermoplastic; and
   fusing the second indicia carrier to the thermoplastic.

8. The method of claim 7 wherein the first indicia carrier has man readable indicia thereon.

9. The method of claim 8 wherein the second indicia carrier has a radio frequency identification thereon.

10. The method of claim 7 wherein the first indicia carrier has a radio frequency identification thereon.

* * * * *